(12) United States Patent
Daniel (10) Patent No.: US 6,850,387 B2
(45) Date of Patent: Feb. 1, 2005

(54) FORM-IN-PLACE GASKET HEIGHT VARIABILITY CONTROL FOR A DISC DRIVE

(75) Inventor: Mathew Daniel, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 228 days.

(21) Appl. No.: 09/885,316

(22) Filed: Jun. 18, 2001

(65) Prior Publication Data

US 2002/0093757 A1 Jul. 18, 2002

Related U.S. Application Data

(60) Provisional application No. 60/262,279, filed on Jan. 17, 2001.

(51) Int. Cl.[7] ............................. G11B 33/14; F16J 15/10
(52) U.S. Cl. ................................... 360/97.02; 277/644
(58) Field of Search ........................ 360/97.01, 97.02, 360/97.03; 277/628, 644, 650; 427/385.5

(56) References Cited

U.S. PATENT DOCUMENTS

| | | | |
|---|---|---|---|
| 4,832,349 A | | 5/1989 | Kawai et al. |
| 4,896,231 A | | 1/1990 | Hoppe |
| 4,950,521 A | | 8/1990 | Takamura et al. |
| 5,147,691 A | | 9/1992 | Shimamoto et al. |
| 5,326,611 A | | 7/1994 | Kishita et al. |
| 5,364,676 A | | 11/1994 | Takago et al. |
| 5,371,637 A | | 12/1994 | Yamada |
| 5,446,606 A | | 8/1995 | Brunner et al. |
| 5,582,411 A | * | 12/1996 | Tyler .......................... 277/650 |
| 5,754,366 A | * | 5/1998 | Yoshino ................... 360/97.02 |
| 5,825,575 A | | 10/1998 | Lee |
| 5,882,729 A | | 3/1999 | Kahl et al. |
| 5,945,463 A | | 8/1999 | Kawabuchi et al. |
| 5,964,465 A | | 10/1999 | Mills et al. |
| 6,001,181 A | | 12/1999 | Bullen |
| 6,096,413 A | * | 8/2000 | Kalinoski et al. ........... 428/220 |
| 6,303,180 B1 | * | 10/2001 | Bunyan et al. ............... 427/58 |
| 6,308,961 B1 | * | 10/2001 | Kunikane et al. ........... 277/637 |
| 6,329,014 B1 | * | 12/2001 | Kahl et al. ..................... 427/58 |
| 6,420,649 B1 | * | 7/2002 | Kahl et al. ................. 174/35 R |
| 6,619,667 B2 | * | 9/2003 | Kawaguchi et al. ........ 277/628 |
| 6,631,049 B2 | * | 10/2003 | Satoh et al. ............. 360/97.02 |

FOREIGN PATENT DOCUMENTS

JP    5-140273    *  6/1993

* cited by examiner

Primary Examiner—Brian E. Miller
(74) Attorney, Agent, or Firm—Jennifer M. Buenzow; Daniel P. Dooley (57) ABSTRACT

Forming a top cover assembly of a disc drive by providing a top cover to a gasket-dispensing device, accelerating a gasket material dispensing head of the gasket-dispensing device over a staging portion of a gasket support portion of the top cover, supplying an uncured gasket material to the accelerating gasket material dispensing head, dispensing a substantially constant increasing thickness gradient of uncured gasket material adjacent the staging portion, discharging a substantially dimensionally uniform bead of the uncured gasket material onto the support surface, applying a substantially constant decreasing thickness gradient of the uncured gasket material adjacent the substantially constant increasing thickness gradient of uncured gasket material and curing the uncured gasket material to form the top cover assembly.

27 Claims, 4 Drawing Sheets

FORM-IN-PLACE GASKET HEIGHT VARIABILITY CONTROL FOR A DISC DRIVE

RELATED APPLICATIONS

This application claims priority to U.S. Provisional Application No. 60/262,279 filed Jan. 17, 2001, entitled Eliminating Variability In Height of Form-In-Place Gaskets At Start and Stop Points of the Bead.

FIELD OF THE INVENTION

This invention relates generally to the field of data storage devices, and more particularly, but not by way of limitation, to incorporation of a method for controlling variability of formed-in-place gasket bead height of a formed-in-place gasket of a disc drive.

BACKGROUND

Disc drives are used for data storage in modern electronic products ranging from digital cameras to computers and network systems. Typically, a disc drive includes a mechanical portion, or head disc assembly (HDA), and electronics in the form of a printed circuit board assembly (PCB), mounted to an outer surface of the HDA. The PCB controls HDA functions and provides a communication interface between the disc drive and a host being serviced by the disc drive.

Typically, an HDA includes a magnetic disc surface affixed to a spindle motor assembly for rotation at a constant speed and an actuator assembly positionably controlled by a closed loop servo system. The actuator assembly supports a read/write head that traverses generally concentric magnetic tracks radially spaced across the disc surfaces.

Continued demand for disc drives with ever-increasing levels of data storage capacity, faster data throughput and decreasing price per megabyte have led disc drive manufacturers to seek ways to increase the storage capacity and improve overall operating efficiencies of the disc drive. Present generation disc drives typically achieve bit densities of multiple gigabits per square centimeter, $Gbits/cm^2$. Increasing bit densities can be achieved by increasing the number of bits stored along each track, or bits per inch (BPI), generally requiring improvements in the read/write channel electronics, and/or by increasing the number of tracks per unit width, or tracks per inch (TPI), generally requiring improvements in servo control systems. As bit density increases it is not uncommon for fly heights to decrease, which heighten the need to control environmental conditions internal to the disc drive.

One approach taken by disc drive manufacturers to improve control of the internal environment has been the inclusion of pre-formed gasket material sandwiched between enclosure components. The inclusion of gasket material between a mating line of the enclosure sections precludes passage of external environmental conditions into the disc drive. For example, gaskets have been utilized to alleviate air leaks between base and top cover disc drive configurations, or between sections of clamshell style disc drive configurations. U.S. Pat. No. 4,896,231 issued to Hoppe exemplifies one such construction of a pre-formed gasket recently proposed in the art, which seals the inner workings of the disc drive from its external environment. The Hoppe solution incorporates a multi-layer approach that includes a central stiffener member sandwiched between a pair of foam layers. Typically, pre-formed gaskets, either single or multi layered, are punched from sheets of gasket material. Punched gaskets provide highly functional gaskets but result in producing large volumes of waste material as a consequence of the punching process. Additionally, as configurations change between product lines, multiple configurations of gaskets must be managed through the purchase, transport, receipt, quality conformation, stocking, and issue of the gaskets as part of the overall manufacturing process. These material management costs can easily overshadow the cost of the gasket itself.

An alternate approach is exemplified by U.S. Pat. No. 5,326,611 issued to Kishita et al, which proposes the use of a fluorosilicone rubber composition injected on a surface of one of either enclosure components of the disc drive. In addition to the use of fluorosilicone rubber, other known approaches in the art incorporate the use of formed-in-place silicone rubber gaskets. In either case, the method of application of the gasket material involves utilization of a pressurized delivery system for delivery of the material to the selected enclosure component. The delivery method is similar to (with exceptions) dispensing the gasket material through the use of a syringe. Additionally, a characteristic common to both materials is their propensity to out-gas volatiles that remain within the material subsequent to the cure process. Out-gassing, even at a significantly reduced rate, directly impact head-disc interface, leading to a deterioration in fly height and head crashes.

As such, challenges remain and a need persists for improved materials and techniques for providing gaskets that are cost effective and maintain the internal environment of a disc drive.

SUMMARY OF THE INVENTION

Embodiments of the present invention provide a method for controlling height variability of a formed-in-place gasket of a disc drive. Steps of the method include providing a top cover to a gasket-dispensing device by placing the top cover on a conveyor assembly of the gasket-dispensing device. The conveyor assembly positions the top cover adjacent a gasket material dispensing head of the gasket-dispensing device. With the top cover in position, the gasket material dispensing head is accelerated at a predetermined rate, moving the gasket material dispensing head adjacent a staging portion of a gasket support surface of the top cover. Subsequent to commencement of the acceleration of the gasket material dispensing head, an uncured gasket material is supplied to the gasket material dispensing head. The uncured gasket material is supplied at an increasing rate such that a substantially constant increasing thickness gradient of the uncured gasket material is dispensed adjacent the staging portion of the top cover, thereby providing a lead-in portion of the uncured gasket.

Following the acceleration of the gasket material dispensing head, the gasket material dispensing head attains a constant velocity concurrent with the supply of the uncured gasket material attaining a substantially dimensionally uniform volumetric flow rate. With the gasket material dispensing head at a constant velocity and the flow rate of the uncured gasket material substantially dimensionally uniform, a bead of substantially dimensionally uniform uncured gasket material is discharged on to the gasket support surface of the top cover. A predetermined closed configuration of the bead of substantially dimensionally uniform uncured gasket material is formed using a robotic positioning arm to guide the gasket material dispensing head along a predetermined path. While being guided by the robotic positioning arm the gasket material dispensing head discharges the uncured gasket material adjacent the gasket support surface of the top cover thereby forming a main portion of the uncured gasket.

Upon reencountering the staging portion of the gasket support surface, a substantially constant decreasing thickness gradient of the uncured gasket material is supplied and applied adjacent the lead-in portion of the uncured gasket. Application of the substantially constant decreasing thickness gradient of the uncured gasket material results in a formation of an exit portion of the uncured gasket.

With the uncured gasket formed adjacent the gasket support surface of the top cover, the uncured gasket and the top cover are exposed to and held at a cure temperature of the uncured gasket material for a time sufficient to initiate and complete a cross-link of the uncured gasket material, thereby forming a top cover assembly with an attached formed-in-place gasket.

These and various other features and advantages, which characterize embodiments of the present invention, will be apparent from the reading of the following detailed description and review of the associated drawings.

DETAILED DESCRIPTION

Figure 1:
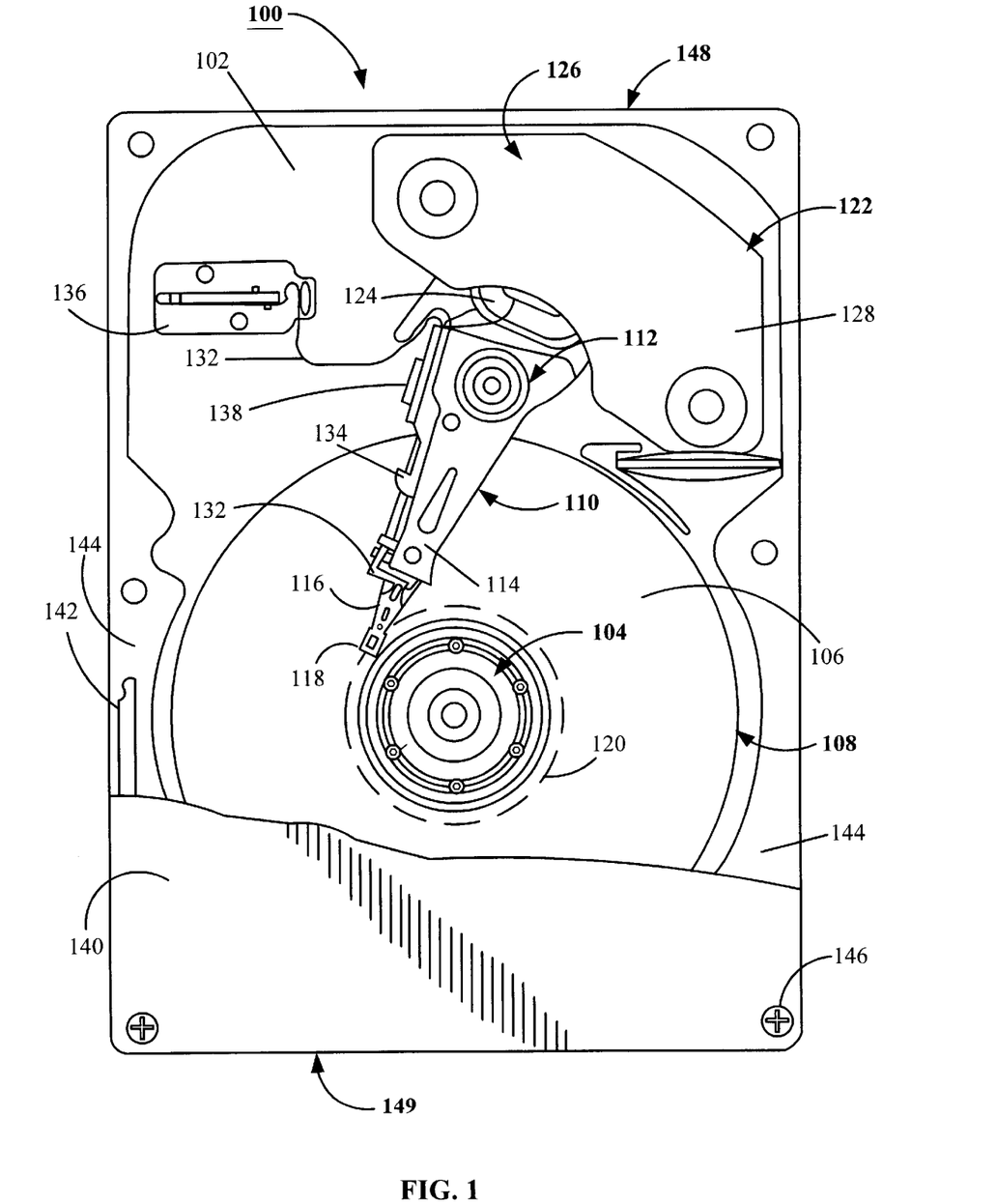
FIG. 1 is a top plan view of a disc drive incorporating a height variability control formed-in-place gasket applied in accordance with an embodiment of the present invention.

Referring to the drawings in general, and more particularly to FIG. 1, shown therein is a top view of a disc drive 100 constructed in accordance with an embodiment of the present invention. Numerous details and variations of the construction of the disc drive 100 are not included in the following description, as such are well-known to those skilled in the art and are believed to be unnecessary for the purpose of describing embodiments of the present invention.

The disc drive 100 includes a basedeck 102 (also referred to herein as a base 102) supporting various disc drive components, including a spindle motor assembly 104. The spindle motor assembly 104 supports at least one axially aligned rotatable disc surface 106 forming a disc stack 108 (also referred to as a "disc pack"). Adjacent the disc stack 108 is an actuator assembly or HSA (head stack assembly) 110 (also referred to as an E-block 110), which pivots about a primary actuator motor support 112 (also referred to as a bearing assembly) in a rotary fashion. The HSA 110 includes at least one actuator arm 114 that supports a load arm 116. Each load arm 116 in turn supports at least one positionable read/write head 118 that correspond to each disc surface 106. Each disc surface 106 is divided into concentric circular data tracks 120 (only one depicted) over which the read/write heads 118 are positionably located, and on which head position control information are written to embedded servo sectors (not separately shown). The embedded servo sectors separate a plurality of data sectors (not separately shown) for use by customers to store data.

The HSA 110 is controllably positioned by a primary actuator motor 122 (also referred to as a voice coil motor assembly, VCM), comprising an actuator coil 124 immersed in the magnetic field generated by a magnet assembly 126. A magnetically permeable flux path provided by a steel plate 128 (also called a top pole piece) is mounted above the actuator coil 124 to complete the magnetic circuit of the VCM 122. During operation of the disc drive 100, current is passed through the actuator coil 124 and an electromagnetic field is setup, which interacts with the magnetic circuit of the VCM 122 to cause the actuator coil 124 to move relative to the magnet assembly 126 in accordance with the well-known Lorentz relationship. As the actuator coil 124 moves, the HSA 110 pivots about the bearing assembly 112 (also referred to as a primary actuator motor support), causing the heads 118 to move over the surfaces of the discs 106, thereby positioning of the heads 118 adjacent a selected data track 120 of the disc surfaces 106.

During operations of the disc drive 100, an air filter 130 continually cleans the internal environment of the disc drive 100 by removing debris generated through the operation of the disc drive 100. Removal of particles generated through typical operations of the disc drive 100 advances the ability of the disc drive 100 to operate reliably by reducing the chances of premature failure resulting from a head crash propagated by airborne particulate contaminants.

To provide the requisite electrical conduction paths between the read/write heads 118 and disc drive read/write circuitry (not shown), read/write head conductors (not separately shown) are affixed to a read/write flex circuit 132. The read/write flex circuit 132 is routed from the load arms 116 along the actuator arms 114 and into a flex circuit containment channel 134, then on to a flex connector body 136. The flex connector body 136 supports the read/write flex circuit 132 during passage of the read/write flex circuit 132 through the basedeck 102 and into electrical communication with a disc drive printed circuit board assembly (PCB, not shown) mounted to the underside of the basedeck 102. The read/write flex circuit 132 also supports read/write signal circuitry, including preamplifier/driver (preamp) 138 used to condition read/write signals passed between the read/write circuitry (not shown) and the read/write heads 118. The PCB of the disc drive supports read/write circuitry, which controls the operation of the heads 118, as well as other interface and control circuitry for the disc drive 100.

A top cover 140 (also referred to herein as a cover 140) compresses a formed-in-place gasket 142 (partially removed) against support surface 144 of the basedeck 102 as a result of securing top cover fasteners 146 through the top cover 140 and into the basedeck 102. The attached top cover 140 in combination with the formed-in-place gasket 142 along with the disc pack 108 and the HSA 110 secured to the basedeck 102 form a head-disc-assembly 148. The top cover 140, the formed-in-place gasket 142 the basedeck 102 form an enclosure 149 portion of the head-disc-assembly 148 that provides a sealed environment within the enclosure upon securing the top cover 140 to the basedeck 102 with the top cover fasteners 146.

Figure 2:
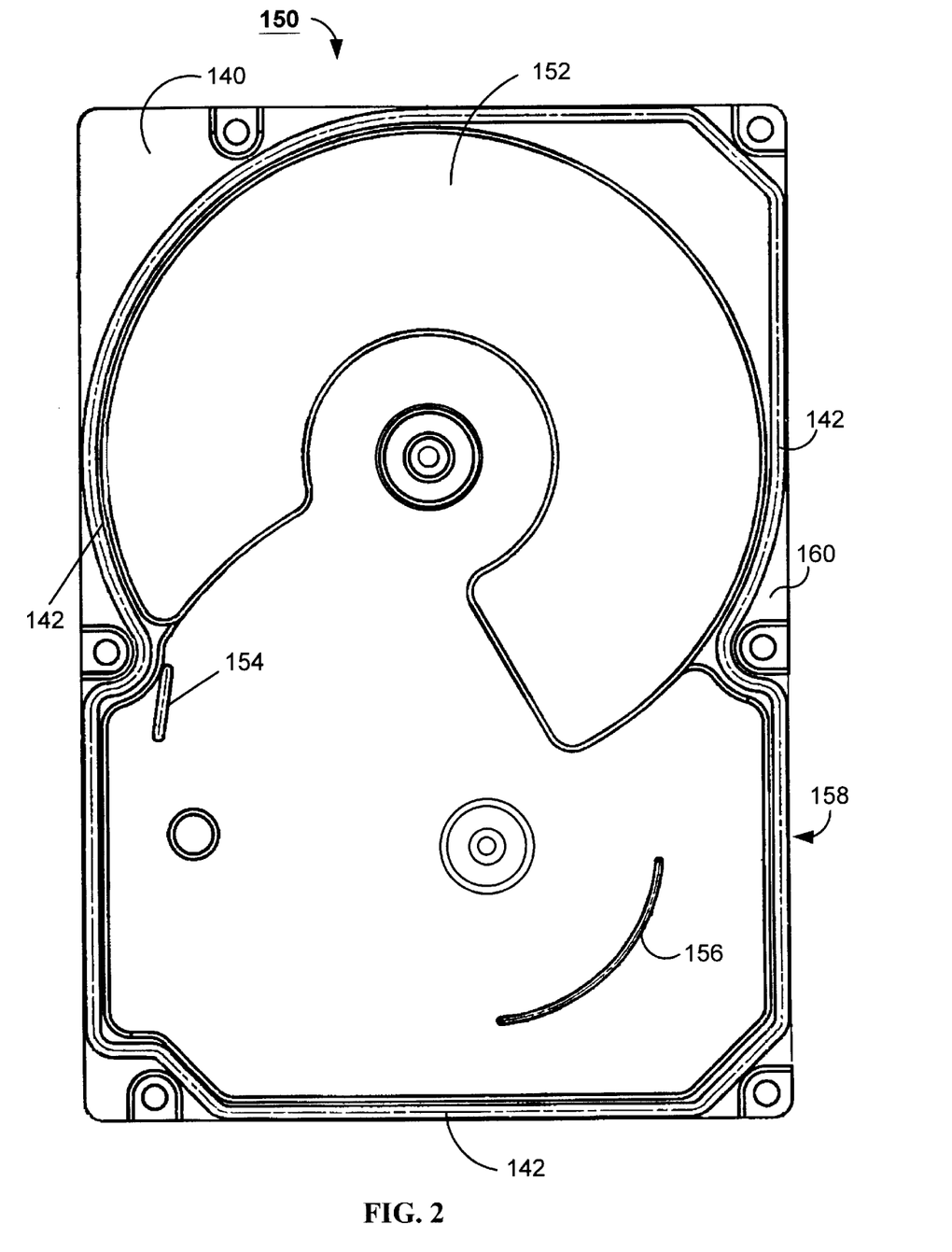
FIG. 2 is a bottom plan view of a top cover with a height variability control formed-in-place gasket of the disc drive of FIG. 1.

Shown by FIG. 2, the top cover assembly 150 can include a resonance tuning weight 152, an air filter containment portion 154, a pole piece stabilization portion 156, a staging portion 158 of the top cover 140, a gasket support surface 160 of the top cover 140, the top cover 140 and the formed-in-place gasket 142. The resonance tuning weight 152 is used to change the mass of cover assembly 150 to move the resonance frequency at which the top cover 142 resonates to a frequency band non-sympathetic to a servo system (not separately shown) of the disc drive 100.

The air filter containment portion 154 and the pole piece stabilization portion 156 can both be applied to the top cover 140 during a process of applying the formed-in-place gasket 142 to the top cover 140. The air filter containment portion 154 maintains the position of the air filter 130 in relation to the basedeck 102 by applying a compressive load to the air filter 130 as a result of securing the top cover assembly 150 to the basedeck 102, using the top cover fasteners 146 (of FIG. 1). The pole piece stabilization portion 156 provides stability to the VCM 122 (of FIG. 1) during operations of the disc drive 100 while maintaining a predetermined separation between the top cover 140 and the HSA 110.

Figure 3:
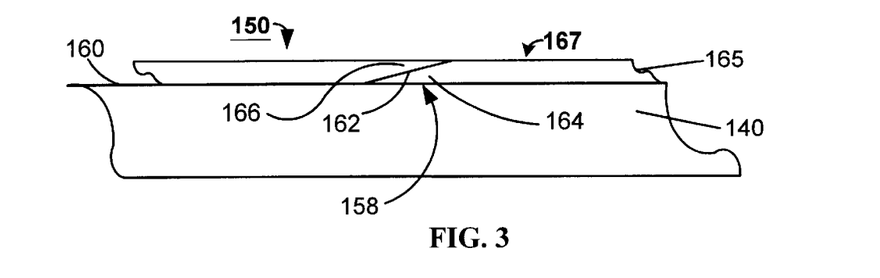
FIG. 3 shows a partial cut-away elevational view of the formed-in-place gasket of FIG. 2.

FIG. 3 shows a knit line 162, a lead-in portion 164, a main portion 165 and an exit portion 166 of an uncured gasket 167. The uncured gasket 167 is supported by the staging portion 158 of the top cover 140, which is included as part of the gasket support surface 160 of the top cover 140 of FIG. 2. The staging portion 158 provides a starting point for application of the uncured gasket 167 to the top cover 140. The lead-in portion 164 is a portion of the uncured gasket material (not separately shown) of the uncured gasket 167 is supported by the staging portion 158 of the gasket support surface 160 and results from controllably building a dispensing volumetric flow rate of the uncured gasket material (not separately shown) to a predetermined level, which when applied to the support surface 160 of top cover 140 results in a bead of uncured gasket material (not separately shown) that complies with predetermined cross-sectional dimensional characteristics of the uncured gasket 167. As a result of controllably building to the predetermined dispensing volumetric flow rate of the uncured gasket material (not separately shown), the cross-sectional dimensional characteristics of the uncured gasket 167 adjacent to and supported the staging portion 158 of the gasket support surface 160 controllably enlarges from an absence of uncured gasket material (not shown separately) to a cross-sectional dimensional characteristic substantially similar to the predetermined cross-sectional dimensional characteristics of the uncured gasket 167.

The main portion 165 of the uncured gasket 167 is a portion of the uncured gasket 167 adjacent the lead-in portion 164, supported by the gasket support surface 160 and in compliance with the predetermined cross-sectional dimensional characteristics of the uncured gasket 167.

The exit portion 166 is a portion of the uncured gasket material (not separately shown) of the uncured gasket 167 supported by the staging portion 158 of the gasket support surface 160 that results from controllably reducing the dispensing volumetric flow rate of the uncured gasket material (not separately shown) from the predetermined level, which when applied to the support surface 160 of top cover 140 results in a bead of uncured gasket material (not separately shown) that complies with predetermined cross-sectional dimensional characteristics of the uncured gasket 167, to an absence of uncured gasket material (not separately shown). As a result of controllably reducing the dispensing volumetric flow rate from the predetermined dispensing volumetric flow rate of the uncured gasket material (not separately shown) to a null dispensing volumetric flow rate, the cross-sectional dimensional characteristics of the uncured gasket 167 adjacent to and supported the staging portion 158 of the gasket support surface 160 controllably decreases from a cross-sectional dimensional characteristic substantially similar to the predetermined cross-sectional dimensional characteristics of the uncured gasket 167 to an absence of uncured gasket material (not shown separately).

In an embodiment of the present invention the knit line 162 of the uncured gasket 167 occurs when the lead-in portion 164 of the uncured gasket 167 and the exit portion 166 of the uncured gasket 167 form a coextensive portion (not shown separately) of the main portion 165 of the uncured gasket 167 as a result of the exit portion 166 of the uncured gasket 167 overlaying the lead-in portion 164 of the uncured gasket 167. The width and length of the knit line 162 defines the length of the coextensive portion and is empirically determined for each disc drive 100 (of FIG. 1) configuration, based on the characteristics of the mating components used in forming a enclosure portion 149 for the HDA 148 (of FIG. 1), in conjunction with the capability of the formed-in-place gasket application equipment (not shown).

Viewing FIG. 2 and FIG. 3 in combination, the length of the staging portion 158 for the embodiment shown therein is coextensive in the linear direction with the formed-in-place gasket 142. Additionally, the width of the staging portion 158 is substantially the width of the formed-in-place gasket 142. However, the placement and geometric configuration of the staging portion 158 are not limitations on the present invention.

Figure 4:
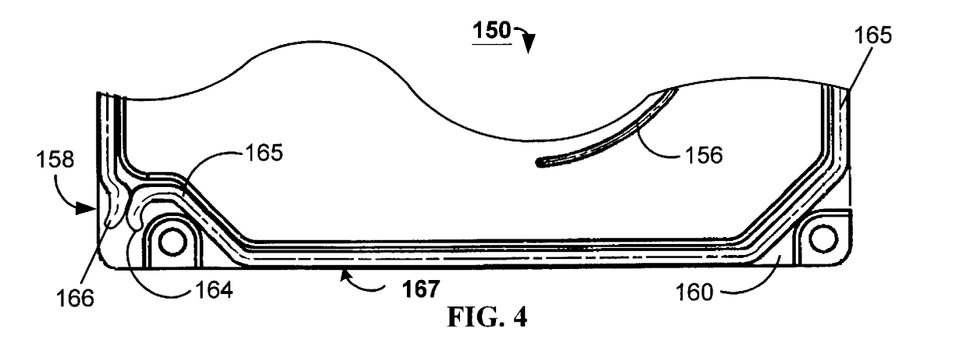
FIG. 4 is a partial cut-away bottom plan view of the top cover with an offset staging portion for the formed-in-place gasket of the disc drive of FIG. 1.

FIG. 4 shows an alternate embodiment for the staging portion 158 of the formed-in-place gasket support surface 160. In the embodiment shown by FIG. 4, the staging portion 158 of the top cover is disposed adjacent or to one side of the formed-in-place gasket 142. Placement of the staging portion 158 adjacent to the formed-in-place gasket 142 provides space for the lead-in portion 164 of the uncured gasket 167 and the exit portion 166 of the uncured gasket 167.

The staging portion 158 is non-coextensive with the region of the gasket support surface 160. The formed-in-place gasket-dispensing device (discussed below) has the space and time rate to bring the flow of the material used in forming the formed-in-place gasket 142 to a control dispensing volume, which allows the formed-in-place gasket 142 to be applied to the gasket support surface 160 at a substantially uniform height and width. The lead-in portion 164 and the exit portion 166 communicating with the main portion 165 typically have a variability in volume of gasket material per linear millimeter that is greater than volume of gasket material per linear millimeter of the formed-in-place gasket 142. The lead-in portion 164 gradually builds in height to the desired height and the exit portion 166 gradually decreases in height to the desired height.

Figure 5:
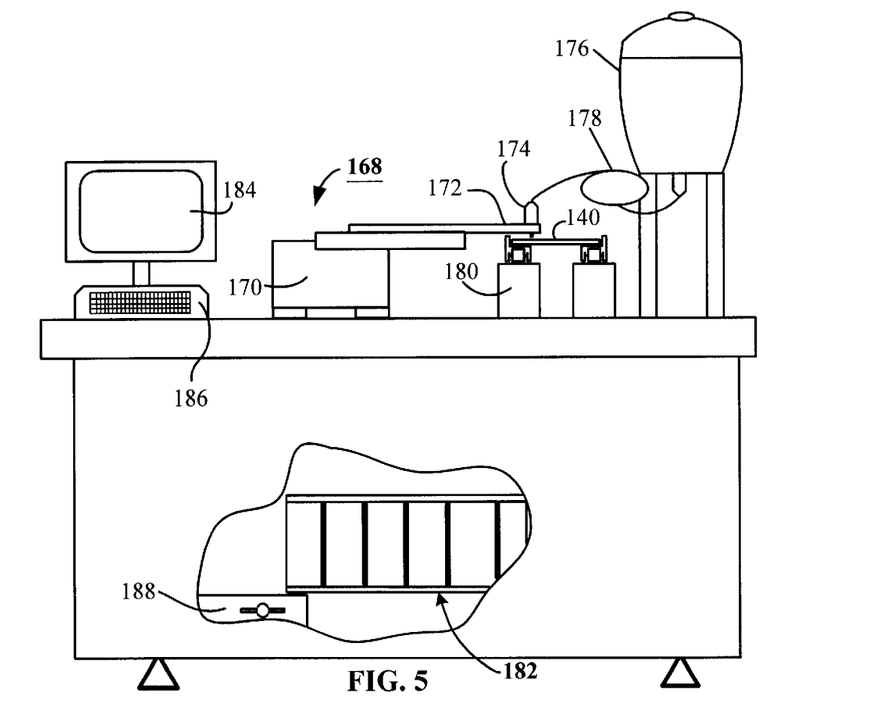
FIG. 5 is an elevational view of a formed-in-place gasket-dispensing device for dispensing the height variability control formed-in-place gasket to the top cover of FIG. 2.

Whether coextensive with or adjacent to the region of the gasket support surface 160 designated for support of the formed-in-place gasket 142, the staging portion 158 is used to accommodate the control capabilities of a gasket-dispensing device, such as gasket-dispensing device 168 shown by FIG. 5.

As will be recognized by those skilled in the art, the mechanical configurations of formed-in-place gasket-dispensing devices, such as 168 of FIG. 5, vary to accommodate a particular disc drive and manufacturing processes selected to produce that particular disc drive. The mechanical presentation of gasket-dispensing device 168 has been elected to add clarity and brevity in disclosing the subject matter of the invention. The elected structure is but one of multiple configurations in which numerous changes would readily suggest themselves to those skilled in the art, without changing the functionality of the gasket-dispensing device 168.

As shown by FIG. 5, included in the gasket-dispensing device 168 is a robotic positioning arm 170 with an end-effector 172 communicating with a gasket material dispensing head 174. The gasket material dispensing head 174 communicates with a gasket material reservoir 176 through a gasket material transport means 178.

In a preferred embodiment, the formed-in-place gasket material is an epoxidized elastomer, such as 3M 7001 produced by the 3M Company of St. Paul, Minn., which cures or cross-links at an elevated temperature in the range of 150° C. for a period of substantially 2 hours. The uncured gasket material is conveyed from the gasket material reservoir 176 through the gasket material transport means 178 to the gasket material dispensing head 174 via the use of a worm gear type auger. The use of a worm gear type auger to convey the gasket material, as opposed to forcing the material through the transport means 178, using a piston or syringe type delivery means, provides two distinct advantages. First the material undergoes a complete mixing during the period of conveyance, and second, any air within the material is brought to the surface and released, rather than being trapped within the material. Air trapped within the material can cause "blow holes" during the cure cycle, or regions of reduced density within the bead of gasket material forming the formed-in-place gasket 142. The occurrence of either, blow holes or regions of reduced density, will negatively affect the sealing capability of the formed-in-place gasket 142.

The top cover 140 is transported and positioned beneath the dispensing head 174 by a conveyor assembly 180. The conveyor assembly 180, the transport means 178 and the robotic positioning arm 170 are individually and collectively controlled and monitored by control electronics 182. The control electronics 182 controls the metering or flow rate of the gasket material flowing through the dispensing head 174 in relation the velocity at which the robotic positioning arm 170 is moving the dispensing head 174. As the robotic positioning arm 170 moves the dispensing head 174, the dispensing head 174 scribes the shape of the formed-in-place gasket 142 on the top cover 140.

The feeds and speeds of the gasket-dispensing device 168 used for dispensing the formed-in-place gasket 142 are determined empirically. Factors used in determining the feeds and speeds for any particular application include the physical configuration of the final formed-in-place gasket 142, the gasket material selected for application and the level of operational precision the gasket-dispensing device 168 is capable of maintaining. Speedline Technologies Camalot of Haverhill, Mass., designs and manufactures automated liquid dispensing systems of which their rotary auger material delivery technology in combination with one of their Camalot line of products, such as the Camalot XYFLEX™ dispensing device, meets the demands of an embodiment of the present invention.

FIG. 5 also shows a monitor 184 and station interface keyboard 186 connected to a gasket dispensing station computer 188. The computer 188 controls overall station operations, provides process sequencing information, including top cover 140 configuration input to the control electronics 182, which in turn selects the control routine used for controlling the configuration of the formed-in-place gasket 142 to be dispensed and initiates the dispensing operation. The gasket dispensing station computer 188 is also used in diagnosing dispensing status and station problems. Additionally, the station computer 188 communicates with an overall manufacturing control system (not shown) by reporting station performance and inventory status.

In securing the formed-in-place gasket 142 to the disc drive cover 140 it is of importance that the variability in height of the uncured gasket 167 (of FIG. 3) being applied to the top cover 140 (of FIG. 3) be kept to a minimum. In a preferred embodiment, the overall deviation in height of the formed-in-place gasket 142 is held to substantially a +/−0.003 inches (+/−0.0076 cm.), to assure sealing of the disc drive 100 is intact and remains un-compromised following installation of the top cover assembly 150 to the basedeck 102 of FIG. 1.

To maintain control of height variability of the formed-in-place gasket 142, the staging portion 158 is used to gradually bring the bead of gasket material to a predetermined height, i.e., the lead-in portion 164. The mass of the uncured gasket material, the velocity at which the robotic positioning arm 170 moves the gasket material dispensing head 174, the rate at which the rotary auger (not shown separately) of the gasket-dispensing device 168 delivers the uncured gasket material (not shown separately) and the dimension of an exit aperture (not shown separately) of the gasket material dispensing head 174 collectively contribute to the steady-state height of the uncured gasket material dispensed on the top cover 140 (of FIG. 1). However, prior to attaining a control steady-state height for dispensing the uncured gasket material used in forming the formed-in-place gasket 142, the gasket material dispensing head 174 undergoes an acceleration in moving from a stationary position to a constant velocity. Additionally, the rotary auger (not shown separately) used to convey the uncured gasket material to the top cover 140 also undergoes an acceleration from a stationary position to a constant angular velocity.

In dispensing the uncured gasket material used in forming the formed-in-place gasket 142, the gasket material dispensing head 174 begins its acceleration process prior to the rotary auger (not shown separately) beginning its acceleration process. The rate at which the gasket material dispensing head 174 accelerates to its substantially constant velocity depends on the desired mass per unit length characteristics of the uncured gasket material bead being applied to the top cover 140, and the rate at which the rotary auger (not shown separately) accelerates to its substantially constant angular velocity target.

Following the initiation of the acceleration of the gasket material dispensing head 174, acceleration of the rotary auger (not simply shown) begins. This sequencing of beginning the acceleration of the gasket material dispensing head 174 prior to beginning the acceleration of the rotary auger (not separately shown) allows the deposit of a substantially constant increasing thickness gradient of uncured gasket material along the length of the staging portion 158. Having achieved the desired velocity for both the gasket material dispensing head 174 and the rotary auger (not separately shown), the uncured gasket material being dispensed is dimensionally substantially uniform. The uncured gasket material remains substantially dimensionally stable throughout the remaining application of the uncured gasket material until the gasket material dispensing head 174 once again approaches the staging portion 158.

As the gasket material dispensing head 174 approaches the staging portion 158 of the gasket support surface 160 (of FIG. 2), the rotary auger begins a deceleration process, which reduces the volume of uncured gasket material being dispensed by the gasket material dispensing head 174. Once the rotary auger has begun its deceleration process the gasket material dispensing head 174 begins a deceleration process. The combination of these deceleration processes provides or allows for a deposit of a substantially constant decreasing thickness gradient of uncured gasket material, adjacent the staging portion 158. The rate at which the thickness gradient of the uncured gasket material is decreasing is substantially the same rate that the substantially constant increasing thickness gradient of uncured gasket material dispensed on the top cover 140 underwent during the beginning of the uncured gasket material dispensing process.

The uncured gasket 167 results from the application of the substantially constant increasing thickness gradient of the uncured gasket material to the staging portion 158 of the gasket support surface 160, followed by the application of the dimensionally substantially uniform uncured gasket material to the gasket support surface 160, and concluding with the application of the substantially constant decreasing thickness gradient of the uncured gasket material adjacent the staging portion 158.

For the embodiment of the top cover assembly 150 shown by FIG. 2, the staging portion 158 of the gasket support surface 160 lies coextensive with the final position of the formed-in-place gasket material 142. For the coextensive case, the deposit of a substantially constant decreasing thickness gradient of gasket material corresponds to and is rate consistent, but at a decreasing rate, with the substantially constant increasing thickness gradient of gasket material laid down during the beginning of the gasket material dispensing process. The decreasing thickness gradient of the gasket material occurring at the conclusion of the gasket dispensing process overlays the increasing thickness gradient of the gasket material laid down at the beginning of the gasket material dispensing process. The result of this overlay is the formation of the knit line 162 of FIG. 3, and an overall thickness of the formed-in-place gasket material 142 occupying the staging portion 158 substantially consistent with thickness of the formed-in-place gasket material 142 occupying the balance of the gasket support surface 160 of FIG. 2.

For the embodiment of the top cover assembly 150 shown by FIG. 3, the lead-in portion 164 and the exit portion 166 have substantially the same height profile and, once cured, become substantially non-distinguishable.

Figure 6:
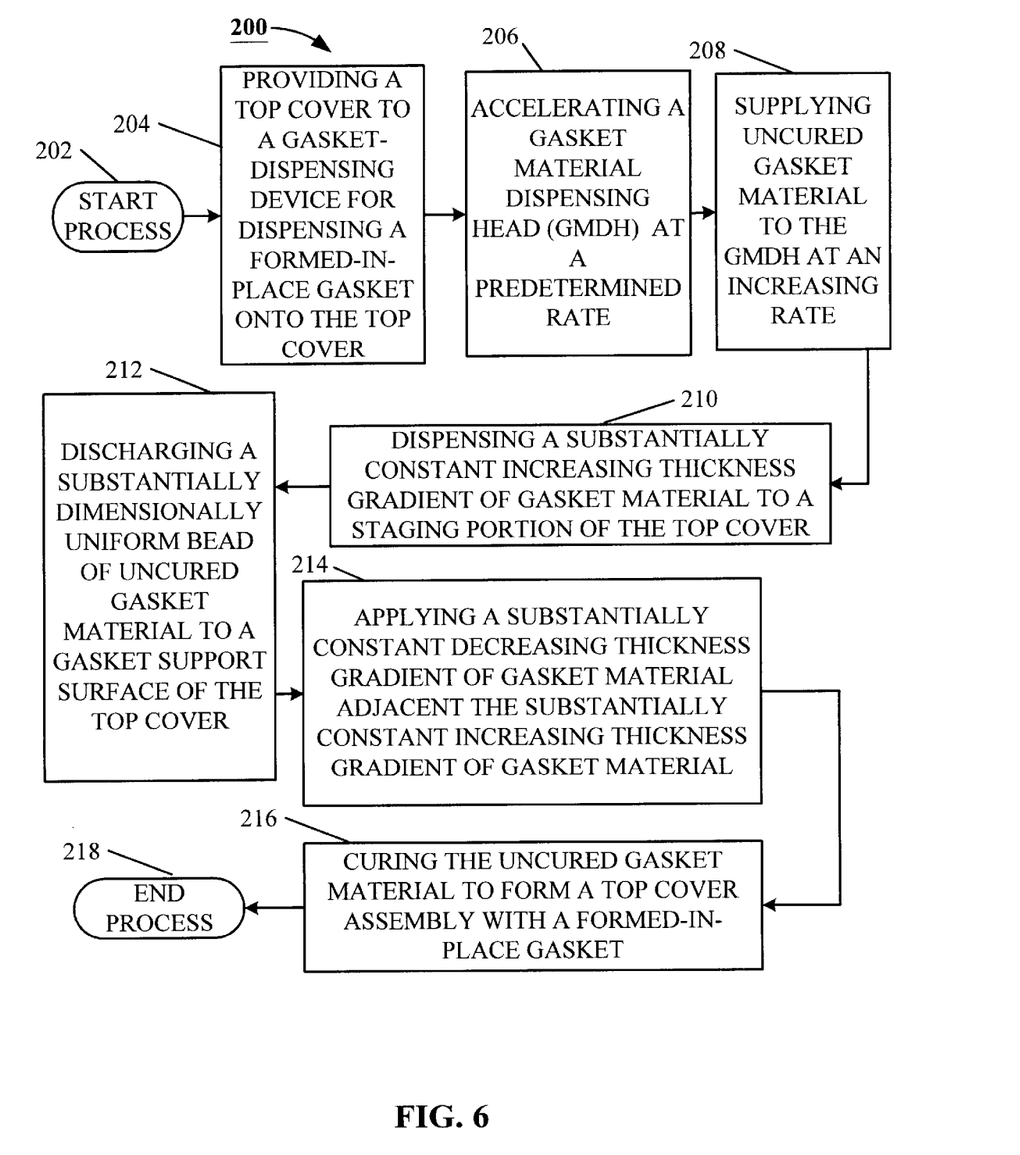
FIG. 6 is a flow diagram showing steps for applying the height variability control formed-in-place gasket to the top cover of FIG. 2.

FIG. 6 shows a block diagram of a top cover assembly forming process 200 used in forming a top cover assembly (such as 150). The top cover assembly forming process 200 includes the application and curing of a formed-in-place gasket (such as 142) to a top cover (such as 140) of a disc drive (such as 100). The top cover assembly forming process starts at start process step 202 and continues with step 204. At process step 204, the top cover is provided to a gasket-dispensing device (such as 168) for dispensing uncured gasket material (not separately shown) adjacent a gasket support surface (such as 160) of the top cover.

The top cover is provided to the gasket-dispensing device through the use of a conveyor assembly (such as 180). The conveyor assembly aligns the top cover beneath a gasket material dispensing head (such as 174). The gasket material dispensing head is supported by an end-effector (such as 172) that communicates with a robotic positioning arm (such as 170). The robotic positioning arm maintains the gasket material dispensing head at a predetermined position while awaiting the start of process. Once the top cover forming assembly process begins, the robotic positioning arm controls the acceleration, velocity and position of the gasket material dispensing head for placement of the uncured gasket material adjacent the gasket support surface.

With the top cover in position, the top cover assembly forming process 200 continues with process step 206 where the gasket material dispensing head is accelerated from a stationary position to a final velocity at a predetermined rate of acceleration. The rate of acceleration is empirically determined for each specific top cover. The factors involved in determining the acceleration rate of the gasket material dispensing head include the geometry of the desired formed-in-place gasket, the flow characteristics of the uncured gasket material, the dimensions of a gasket material output aperture (not separately shown) of the gasket material dispensing head, and the precision and tolerance holding abilities of the gasket-dispensing device.

The next step, supplying uncured gasket material to the gasket material dispensing head at an increasing rate, is process step 208. Supplying the uncured gasket material to the gasket material dispensing head occurs after the gasket material dispensing head has entered the accelerating step 206. Delaying the supplying of the uncured gasket material to the gasket material dispensing head limits the propensity of the uncured gasket material to form a "blob" of uncured gasket material at the beginning of the top cover assembly forming process 200. Metering the uncured gasket material supplied to the gasket material dispensing head at a predetermined rate while the gasket material dispensing head is accelerating allows the applied gasket material to begin very thin and build, at a controlled rate, to the desired thickness while the gasket material dispensing head is reaching its final velocity. Thereby dispensing a substantially constant increasing thickness gradient of gasket material to a staging portion (such as 158) of the top cover, as called for by step 210.

The staging portion of the gasket support surface is selected as the physical starting point of the top cover assembly forming process 200. The conveyor assembly positions the selected staging portion beneath the gasket material dispensing head. The staging portion can be either coextensive with or adjacent to the region of the gasket support surface selected for applying the bead of formed-in-place gasket. If the staging portion is coextensive to the region of the gasket support surface selected for the application of the formed in-place gasket bead, a knit line (such as 162) will result from the application of the bead of formed-in-place in gasket material. However, if the staging portion selected is adjacent the bead of formed-in-place gasket material, a lead-in portion (such as 164) may be adjacent an exit portion (such as 166), resulting from the application of the bead of formed-in-place gasket material, rather than coextensive with the exit portion.

Having reached the desired velocity of travel for the gasket material dispensing head and the desired thickness for the bead of uncured gasket material, the top cover assembly forming process 200 continues by dispensing a substantially dimensionally uniform bead of uncured gasket material to the gasket support surface of the top cover at process step 212. The robotic positioning arm guides the gasket material dispensing head along a predetermined path that places the uncured gasket material adjacent the gasket support surface, forming a desired formed-in-place gasket material configuration.

As the gasket material dispensing head approaches the staging portion at the conclusion of discharging step 212, process step 214 commences. Process step 214 is essentially the reverse of process step 210. The rate of delivery of the supplied uncured gasket material decreases concurrent with encountering the beginning of the staging portion of the gasket support surface. As a supply of the uncured gasket material decreases, the gasket material dispensing head enters a deceleration phase. The combination of these two events results in the application of a substantially constant decreasing thickness gradient of gasket material adjacent the substantially constant increasing thickness gradient of gasket material applied to the gasket support surface during dispensing step 210 of the top cover assembly forming process 200. Again, if the staging portion is coextensive with the region of the gasket support surface selected for application of the formed-in-place gasket bead, the decreasing thickness gradient of gasket material will be coextensive with and adjacent to the increasing thickness gradient of the gasket material, resulting in the staging portion supporting a final bead of uncured gasket material of substantially the same thickness as the remaining portion of the applied bead of uncured gasket material. If the staging portion is not coextensive with the region of the gasket support surface selected for application of the formed-in-place gasket bead, the decreasing thickness gradient of gasket material need not be coextensive with, but may be adjacent to the increasing thickness gradient of the gasket. Upon conclusion of applying step 214, the top cover assembly forming process 200 concludes with end process step 216.

In accordance with one aspect of a preferred embodiment, steps performed include: providing a top cover to a gasket-dispensing device used in dispensing a uncured gasket material onto the top cover to form a uncured gasket, step 204; accelerating a gasket material dispensing head of the gasket-dispensing device at a predetermined rate of acceleration to move the gasket material dispensing head adjacent a staging portion of a gasket support surface of the top cover to control a length of a lead-in portion of the uncured gasket, step 206; supplying the uncured gasket material to the accelerating gasket material dispensing head at an increasing rate to control a thickness of the lead-in portion of the uncured gasket, step 208; dispensing a substantially constant increasing thickness gradient of the uncured gasket material adjacent the staging portion of the top cover to form the lead-in portion of the uncured gasket, step 210; discharging a substantially dimensionally uniform bead of the uncured gasket material adjacent the gasket support surface of the top cover to form a main portion of the uncured gasket, step 212; applying a substantially constant decreasing thickness gradient of the uncured gasket material adjacent the lead-in portion of the uncured gasket to form an exit portion of the uncured gasket, step 214; and curing the uncured gasket to form the top cover assembly with a formed-in-place gasket, step 216.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the formed-in-place gasket while maintaining substantially the same functionality without departing from the scope and spirit of the present invention. In addition, although preferred embodiments described herein are directed to a formed-in-place gasket for a disc drive system, it will be appreciated by those skilled in the art that the teachings of the present invention can be applied to other systems without departing from the scope and spirit of the present invention.

What is claimed is:

1. A method of forming a top cover assembly for a disc drive comprising steps of:
   (a) providing a top cover to a gasket-dispensing device used in dispensing an uncured gasket material onto the top cover to form an uncured gasket;
   (b) accelerating a gasket material dispensing head of the gasket-dispensing device at a predetermined rate of acceleration to move the gasket material dispensing head adjacent a staging portion of a gasket support surface of the top cover prior to supplying the uncured gasket material to the gasket material dispensing head to control a length of a lead-in portion of the uncured gasket;
   (c) supplying the uncured gasket material to the accelerating gasket material dispensing head at an increasing rate to control a thickness of the lead-in portion of the uncured gasket;
   (d) dispensing a substantially constant increasing thickness gradient of the uncured gasket material adjacent the staging portion of the top cover to form the lead-in portion of the uncured gasket;
   (e) discharging a cross sectional substantially uniform bead of the uncured gasket material adjacent the gasket support surface of the top cover to form a main portion of the uncured gasket;
   (f) applying a substantially constant decreasing thickness gradient of the uncured gasket material adjacent the lead-in portion of the uncured gasket to form an exit portion of the uncured gasket wherein the constant decreasing thickness gradient extends along an entire length of said exit portion; and
   (g) curing the uncured gasket to form the top cover assembly with a formed-in-place gasket.

2. The method of claim 1 in which the providing step (a) comprising steps of:
   (a1) placing the top cover on a conveyor assembly used for conveying the top cover to the gasket dispensing device; and
   (a2) conveying and positioning the staging portion of the gasket support surface of the top cover adjacent the gasket material dispensing hand.

3. The method of claim 1 in which determining the predetermined rate of acceleration of accelerating step (b) comprising steps of:
   (b1) measuring a minimum flow rate at which the gasket material dispensing head is capable of supplying the uncured gasket material;
   (b2) determining an amount of time used by the gasket material dispensing head to achieve a predetermined constant volume output of the uncured gasket material from commencement of the measured minimum flow rate; and
   (b3) quantifying a time and a distance of travel for the gasket material dispensing head to move adjacent the staging portion to provide a substantially constant increasing thickness gradient of the uncured gasket material adjacent the staging portion that forms the lead-in portion of the uncured gasket.

4. The method of claim 1 in which determining the staging portion of the gasket support surface of dispensing step (d) comprising steps of:
- (d1) measuring a minimum flow rate that the gasket material dispensing head is capable of supplying the uncured gasket material;
- (d2) determining an amount of time used by the gasket material dispensing head to achieve a predetermined constant volume output of the uncured gasket material from commencement of the minimum flow rate;
- (d3) quantifying a time and a distance of travel for the gasket material dispensing head to move adjacent the staging portion to provide a lead-in portion of the uncured gasket adjacent the staging portion, the lead-in portion has a substantially constant increasing thickness gradient of the uncured gasket material;
- (d4) computing a time and a distance of travel for the gasket material dispensing head to move adjacent the staging portion to provide the exit portion of the uncured gasket, the exit portion has a substantially constant decreasing thickness gradient of the uncured gasket material adjacent the lead-in portion; and
- (d5) selecting a suitable region of the gasket support surface capable of accommodating the lead-in portion and the exit portion of the uncured gasket.

5. The method of claim 1 in which a height of the cross sectional substantially uniform bead of the uncured gasket material of dispensing step (e) is controlled in a range of substantially +/−0.0076 cm. and in which the dispensing step (e) comprising steps of:
- (e1) attaining a constant velocity of travel of the gasket material dispensing head following conclusion of the accelerating step (b);
- (e2) supplying a constant volume per unit time of the uncured gasket material to the gasket material dispensing head for discharge adjacent the gasket support surface; and
- (e3) guiding the gasket material dispensing head along a predetermined path using a robotic positioning arm while discharging the uncured gasket material to form the substantially dimensionally uniform bead of uncured gasket material adjacent the gasket support surface of the top cover to form the main portion of the uncured gasket.

6. The method of claim 1 in which determining the substantially constant decreasing thickness gradient of the uncured gasket material of applying step (f) comprising steps of:
- (f1) measuring a minimum flow rate that the gasket material dispensing head is capable of supplying the uncured gasket material;
- (f2) determining an amount of time used by the gasket material dispensing head to achieve the minimum flow rate of the uncured gasket material following the discharge of the substantially dimensionally uniform bead of the uncured gasket material of discharging step(e); and
- (f3) quantifying a time and a distance of travel for the gasket material dispensing head to move adjacent the lead-in portion of the uncured gasket of the dispensing step (d) to provide the exit portion of uncured gasket, the exit portion of the uncured gasket having a length substantially that of lead-in portion of the uncured gasket.

7. The method of claim 1 in which the uncured gasket material of curing step (g) is an epoxidized elastomer and in which the curing step (g) comprising steps of:
- (g1) exposing the top cover with the uncured gasket to a cure temperature of the uncured gasket material to initiate a cross-link of the uncured gasket material; and
- (g2) holding the top cover with the uncured gasket at the cure temperature of the uncured gasket material for a time sufficient to complete the cross-link of the uncured gasket material.

8. The method of claim 4 in which the lead-in portion of the uncured gasket of the quantifying step (d3) and the exit portion of the uncured gasket of the computing step (d4) jointly form a coextensive portion of the main portion with a cross sectional dimension substantially uniform with the main portion of the supplying step (e) of claim 1.

9. The method of claim 4 in which the lead-in portion of the uncured gasket of the quantifying step (d3) and the exit portion of the uncured gasket of the computing step (d4) are each adjacent the main portion and adjacent one another while occupying separate areas of the staging portion of the gasket support surface.

10. The method of claim 5 in which the lead-in portion of the uncured gasket of the accelerating step (b) of claim 1 and the exit portion of the uncured gasket of the applying step (f) of claim 1 jointly form a coextensive portion of the main portion with a cross sectional dimension substantially uniform with the main portion of the supplying step (e) of claim 1.

11. The method of claim 5 in which the lead-in portion of the uncured gasket of the accelerating step (b) of claim 1 and the exit portion of the uncured gasket of the applying step (f) of claim 1 are each adjacent the main portion and adjacent one another while each occupy a separate area of the staging portion of the gasket support surface.

12. An enclosure for a head disc assembly comprising:
- a base; and
- a cover assembly attached to the base, the cover assembly comprising a cover supporting a formed-in-place gasket comprising a main portion having a cross-sectional height within a predetermined range of height deviation, a lead-in portion and an exit portion, in which each said lead-in and exit portion have a substantially linear rate of change cross-sectional height along an entire length of each said lead-in and exit portion, said gasket providing a seal between the cover and the base.

13. The enclosure of claim 12, in which a sum of the cross-sectional heights of the lead-in portion and the exit portion is substantially within the predetermined range of height deviation.

14. The enclosure of claim 12, in which the main portion of the formed-in-place gasket is disposed on a gasket support surface of the top cover, and both the lead-in portion and the exit portion of the formed-in-place gasket are disposed on a staging portion of the top cover, wherein the staging portion of the top cover is distinct from the gasket support surface of the top cover.

15. The enclosure of claim 12, in which the top cover includes a gasket support surface, the gasket support surface includes a staging portion wherein the lead-in portion of the formed-in-place gasket is disposed on the staging portion of the gasket support surface, and further wherein the exit portion of the formed-in-place gasket is overlappingly disposed on the lead-in portion.

16. The enclosure of claim 15, in which the predetermined range of height deviation is substantially +/−0.0076 cm., and in which the formed-in-place gasket is an epoxidized elastomer.

17. A disc drive comprising:
 a base supporting a rotationally positionable read/write head adjacent a rotatable disc surface; and
 a cover assembly attached to the base enclosing the rotatable disc surface and said read/write head, the cover assembly comprising a cover with a formed-in-place gasket having a main portion with a cross-sectional height within a predetermined range, a lead-in portion and an exit portion, in which each said lead-in and exit portion have a substantially linear rate of change cross-sectional height along an entire length of each said lead-in and exit portion, wherein the cover assembly is built by steps for forming the cover assembly.

18. The disc drive of claim 17 in which forming the top cover assembly comprising steps of:
 (a) providing a top cover to a gasket-dispensing device used in dispensing an uncured gasket material onto the top cover to form an uncured gasket;
 (b) accelerating a gasket material dispensing head of the gasket-dispensing device at a predetermined rate of acceleration to move the gasket material dispensing head adjacent a staging portion of a gasket support surface of the top cover prior to supplying the uncured gasket material to the gasket material dispensing head to control a length of a lead-in portion of the uncured gasket;
 (c) supplying the uncured gasket material to the accelerating gasket material dispensing head at an increasing rate to control a thickness of the lead-in portion of the uncured gasket;
 (d) dispensing a substantially constant increasing thickness gradient of the uncured gasket material adjacent the staging portion of the top cover to form the lead-in portion of the uncured gasket;
 (e) discharging a cross sectional substantially uniform bead of the uncured gasket material adjacent the gasket support surface of the top cover to form a main portion of the uncured gasket;
 (f) applying a substantially constant decreasing thickness gradient of the uncured gasket material adjacent the lead-in portion of the uncured gasket to form an exit portion of the uncured gasket wherein the constant decreasing thickness gradient extends along an entire length of said exit portion; and
 (g) curing the uncured gasket to form the top cover assembly with a formed-in-place gasket.

19. The disc drive of claim 18 in which the providing step (a) comprising steps of:
 (a1) placing the top cover on a conveyor assembly used for conveying the top cover to the gasket dispensing device; and
 (a2) conveying and positioning the staging portion of the gasket support surface of the top cover adjacent the gasket material dispensing hand.

20. The disc drive of claim 18 in which determining the predetermined rate of acceleration of accelerating step (b) comprising steps of:
 (b1) measuring a minimum flow rate at which the gasket material dispensing head is capable of supplying the uncured gasket material;
 (b2) determining an amount of time used by the gasket material dispensing head to achieve a predetermined constant volume output of the uncured gasket material from commencement of the measured minimum flow rate; and
 (b3) quantifying a time and a distance of travel for the gasket material dispensing head to move adjacent the staging portion to provide a substantially constant increasing thickness gradient of the uncured gasket material adjacent the staging portion that forms the lead-in portion of the uncured gasket.

21. The disc drive of claim 18 in which determining the staging portion of the gasket support surface of dispensing step (d) comprising steps of:
 (d1) measuring a minimum flow rate that the gasket material dispensing head is capable of supplying the uncured gasket material;
 (d2) determining an amount of time used by the gasket material dispensing head to achieve a predetermined constant volume output of the uncured gasket material from commencement of the minimum flow rate;
 (d3) quantifying a time and a distance of travel for the gasket material dispensing head to move adjacent the staging portion to provide a lead-in portion of the uncured gasket adjacent the staging portion, the lead-in portion has a substantially constant increasing thickness gradient of the uncured gasket material;
 (d4) computing a time and a distance of travel for the gasket material dispensing head to move adjacent the staging portion to provide the exit portion of the uncured gasket, the exit portion has a substantially constant decreasing thickness gradient of the uncured gasket material adjacent the lead-in portion; and
 (d5) selecting a suitable region of the gasket support surface capable of accommodating the lead-in portion and the exit portion of the uncured gasket.

22. The disc drive of claim 18 in which a height of the cross sectional substantially uniform bead of the uncured gasket material of dispensing step (e) is controlled within a range of substantially +/−0.0076 cm. and in which the uncured gasket material of dispensing step (e) is an epoxidized elastomer and further in which the curing step (g) comprising steps of:
 (e1) attaining a constant velocity of travel of the gasket material dispensing head following conclusion of the accelerating step (b);
 (e2) supplying a constant volume per unit time of the uncured gasket material to the gasket material dispensing head for discharge adjacent the gasket support surface; and
 (e3) guiding the gasket material dispensing head along a predetermined path using a robotic positioning arm while discharging the uncured gasket material to form the substantially dimensionally uniform bead of uncured gasket material adjacent the gasket support surface of the top cover to form the main portion of the uncured gasket.

23. The disc drive of claim 18 in which determining the substantially constant decreasing thickness gradient of the uncured gasket material of applying step (f) comprising steps of:
 (f1) measuring a minimum flow rate that the gasket material dispensing head is capable of supplying the uncured gasket material;
 (f2) determining an amount of time used by the gasket material dispensing head to achieve the minimum flow rate of the uncured gasket material following the discharge of the substantially dimensionally uniform bead of the uncured gasket material of discharging step(e); and (f3) quantifying a time and a distance of travel for the gasket material dispensing head to move adjacent the lead-in portion of the uncured gasket of the dispensing step (d) to provide the exit portion of uncured gasket, the exit portion of the uncured gasket having a length substantially that of the lead-in portion of the uncured gasket.

24. The disc drive of claim 20 in which the lead-in portion of the uncured gasket of the quantifying step (d3) and the exit portion of the uncured gasket of the computing step (d4) jointly form a coextensive portion of the main portion with a cross sectional dimension substantially uniform with the main portion of the supplying step (e).

25. The disc drive of claim 20 in which the lead-in portion of the uncured gasket of the quantifying step (d3) and the exit portion of the uncured gasket of the computing step (d4) are each adjacent the main portion and adjacent one another while occupying separate areas of the staging portion of the gasket support surface.

26. The disc drive of claim 21 in which the lead-in portion of the uncured gasket of the accelerating step (b) of claim 13 and the exit portion of the uncured gasket of the applying step (f) of claim 13 jointly form a coextensive portion of the main portion with a cross sectional dimension substantially uniform with the main portion of the supplying step (e) of claim 13.

27. The disc drive of claim 21 in which the lead-in portion of the uncured gasket of the accelerating step (b) of claim 13 and the exit portion of the uncured gasket of the applying step (f) of claim 13 are each adjacent the main portion and adjacent one another while each occupy a separate area of the staging portion of the gasket support surface.

* * * * *